June 18, 1968  E. I. SIWKO  3,389,301

ARC SUPPRESSING CIRCUIT

Filed Oct. 21, 1965

ERIC I. SIWKO
INVENTOR.

BY Kenway, Jenney & Hildreth

United States Patent Office 3,389,301
Patented June 18, 1968

3,389,301
ARC SUPPRESSING CIRCUIT
Eric I. Siwko, Marlboro, Mass., assignor to Fenwal Incorporated, Ashland, Mass., a corporation of Massachusetts
Filed Oct. 21, 1965, Ser. No. 499,698
3 Claims. (Cl. 317—11)

ABSTRACT OF THE DISCLOSURE

An arc-suppressing circuit for use with a single pole double throw mechanical switch which uses a solid state gate-controlled A.C. switch having a pair of power terminals and a gate terminal. The mechanical switch is connected in series with a source of power and a load. When the switch is in the closed position it shunts the power terminals of the A.C. switch. When it is in the open position, it connects the gate terminal to one of the A.C. switch power terminals. Thus the A.C. switch is rendered non-conducting in both the open and closed positions of the mechanical switch. When the switch is between the open and closed positions, a portion of the source voltage across the mechanical switch is applied to the gate of the A.C. switch to render it conducting, thus providing a low impedance across the mechanical switch contacts, thereby limiting arcing.

My invention relates to arc suppressing circuits, and more particularly to a novel electronic circuit for suppressing arcs occurring across the contacts of a switch which is connecting or disconnecting loads to an alternating current source.

It is well known that the life of electromechanical switches, relays, contactors or like devices used to connect to and disconnect loads from alternating current power sources is substantially limited by the arcing which takes place at the switch contacts during switching. The contacts of such switch devices are ultimately destroyed by continued use because of the arcing which takes place as the contacts move into or out of engagement. This destructive arcing limits the useful life of devices incorporating the switch. It is apparent that if these arcs could be effectively suppressed, the life of switches, relays and like devices would be substantially increased and further, the current that switches are permitted to carry could be increased.

I have developed an improved arc suppressing circuit for use with switch contacts switching a load in an alternating current circuit which effectively suppresses arcing at the switch contacts with the consequent advantages of such a circuit mentioned above. This circuit is simple and economical in construction and reliable in operation, as will be explained in greater detail below.

In brief, the circuit of my invention comprises a solid-state gate-controlled A.C. switch connected in parallel with the contacts of a mechanical single-pole, double-throw switch used to connect a load circuit to an alternating current source in a first position and to break the load circuit in a second position. The solid state switch is preferably of the type having a pair of power terminals and a control terminal. It conducts alternating current between its power terminals when a gating signal is applied between its control terminals and one of the power terminals termed the "reference" terminal. Solid state switches such as those described are presently commercially available and are called "triacs" (an acronym for triode A.C. semiconductor switch). The mechanical switch of my circuit is provided with a pair of contacts which are closed in the position of the switch, when the load circuit is open, and these contacts are connected between the control terminal of the solid state switch and its terminal. By this arrangement, the solid state switch cannot be triggered into conduction when the mechanical switch is in the position when the load circuit is open. An impedance is connected between the control terminal of the solid state switch and its other power terminal, so that while the armature of the mechanical switch is moved from its second position to its first position, a current signal will be supplied to trigger the solid state switch into its conducting state, thereby effectively closing the load circuit until the armature of the mechanical switch is completely closed, whereupon the solid state switch is shorted by the mechanical switch and ceases to conduct. By this arrangement, arcing across the contacts of the mechanical switch is effectively suppressed, and the life of the switch is greatly extended.

Accordingly, it is a principal object of my invention to provide an arc suppressing circuit for use with switching devices used to connect a load to (or disconnect it from) an alternating current source. Another object of my invention is to provide a circuit of the type described which is economical and simple in construction and yet reliable in operation. Other and further objects of my invention will in part be obvious and will in part appear hereinafter.

The circuit of my invention will best be understood in the light of the following detailed description, together with the accompanying drawing of a preferred embodiment thereof.

Figure 1:
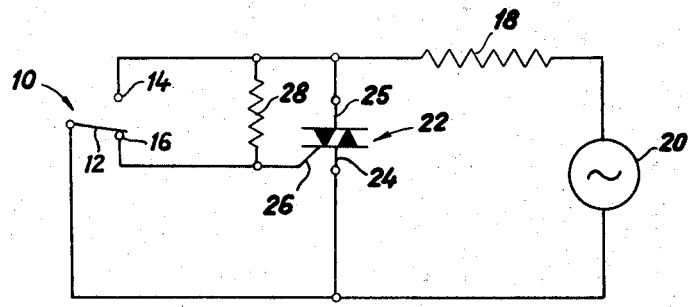
FIGURE 1 is a schematic wiring diagram of a circuit including the arc suppression circuit of my invention.

In FIGURE 1, I show a switching circuit including a single-pole double-throw switch generally indicated at 10. The switch 10 may be the contacts of a relay, or other conventional circuit controller. The fixed contact 14 is connected to a load, shown schematically as a resistor 18 which in turn is connected to an alternating current power source 20, and includes a contact 12 movable to a first position, in which it engages a fixed contact 16.

No specific means have been illustrated to operate the switch 10, it being understood that the switch may be operated by a device such as a relay, temperature sensitive element, etc., whose function is to control power to the load 18. Without protection, as the movable contact 12 moves away from the fixed contact 14 while current is being carried by the contacts, arcing could occur which would erode the switch and burn the contacts. To suppress arcing at these times, we use a solid state gate controlled A.C. switch or triac 22 having power terminals 24 and 25 and a gate terminal 26. The power terminals 24 and 25 of the switch 22 are connected to the switch contacts 12 and 14, and the gate terminal 26 is connected to the mechanical switch contact 16. A resistor 28 is connected between the control terminal 26 of the switch 22 and its power terminal 25. The switch 22 may be any conventional triac, but is preferably a General Electric type SC40D or the type TIC20 made by the Texas Instruments Company. These switches are of a construction such that when a suitable biasing current signal of either polarity is applied between the control terminal 26 and the power terminal 24, the switch 26 will be triggered into a conducting state in which alternating current will flow between its terminals 4 and 5 provided there is also a voltage of either polarity greater than a threshold value of about 0.5 volt across the power terminals.

With the mechanical switch 10 in the position shown, no current flows in the control terminal 26 with reference to the power terminal 24, because the two are connected directly together. However, as the contact 12 leaves the contact 16 when the switch is moved to its first position described above, current will be supplied to the control terminal 26 through the resistor 28, triggering the switch 22 into conduction during the portion of each half cycle of the supply voltage in which the voltage exceeds the threshold value of the switch 22. Current is thereby supplied to the load resistor 18, and the voltage across the contacts 12 and 14 of the switch 22 is then greatly reduced. When the contact 12 fully engages the contact 14, however, the power terminals 24 and 25 of the switch 22 will be shunted, and the voltage across these terminals will fall far below the value at which the switch 22 will remain conducting. The switch 22 will then go into its blocked state, and all the current will flow through contacts 12 and 14 of the switch 10.

When the load circuit is opened, by moving the contact 12 away from the contact 14 the electronic switch 22 will again be triggered into conduction, and will continue to carry the load current until the contact 12 engages the contact 16. After this has occurred, at the next portion of the voltage cycle where the voltage across the terminals 24 and 25 goes through 0, the triac switch 22 will resume its blocked state and be held in that condition by connection of the power terminal 24 to the control terminal 26.

Thus, during the interval when the contact 16 of the switch 10 is transferring between contacts 14 and 16, current through the load is carried by the triac switch 22. However, when the movable contact 12 of the switch 10 engages either contact 14 or contact 16, the triac switch 22 is effectively prevented from conducting, either because the voltage across its power terminals is below its threshold voltage (as when contact 12 engages contact 14) or because there is no gate voltage to maintain conduction when the switch ceases conduction following a zero crossing (contact 12 engaging contact 16).

Figure 2:
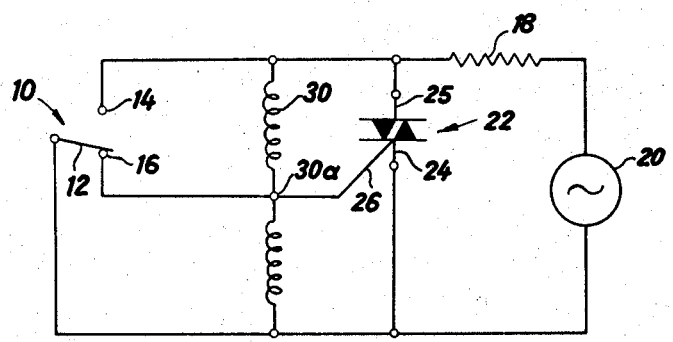
FIGURE 2 is a schematic drawing, similar to FIGURE 1 of an alternative circuit which is particularly useful for higher source voltages.

In FIGURE 2 I have illustrated a second circuit similar to FIGURE 1. However in this circuit the resistor 28 has been replaced by an auto-transformer 30 connected across the source. A tap 30a on the winding of the auto-transformer is connected to the gate terminal 26 of the electronic switch 22 and to the terminal 16 of the mechanical switch 10.

The operation of the circuit of FIGURE 2 is similar to that described above in connection with FIGURE 1. Thus, when the armature 12 is engaging the fixed contact 14 of the switch 10, the electronic switch 22 cannot conduct because the voltage across the power terminals of the switch is below its threshold potential i.e. the switch 22 is shorted. When the armature 12 engages the fixed contact 16 of the mechanical switch 10, the gate terminal 26 of the electronic switch is connected directly to the power terminal 24 and no signal voltage can appear between them. However, if the armature 12 is engaging neither contact 14 or 16, then the source voltage will be applied, by auto-transformer action between the gate terminal 26 and the power terminal 24, causing the electronic switch 22 to conduct so long as the armature 12 is not firmly engaging either contact. Thus, the electronic switch conducts and carries the load current during any time when the armature is transferring between contacts 14 and 16 of the mechanical switch 10. The circuit of FIGURE 2 has particular utility when the voltage of the source 20 is higher than about 110 volts R.M.S. At these higher voltages, the power dissipation requirements of the resistor 28 of FIGURE 1 become substantial and therefore the resistor becomes relatively expensive.

It will thus be seen that I have provided a simple yet effective circuit for the suppression of arcs in alternating current circuits. The circuits of my invention provide an alternate path for current flow during any period of time that the mechanical switch which makes or breaks power to the load is not in full engagement. This alternate path carries the current that would otherwise cause arcing at the mechanical switch contacts. The arc suppression circuit of my invention not only substantially lengthens the life of switch contacts used to make and break power to a load but also increases the permitted current rating of the switch since, in effect, it need carry only steady state current.

It should also be noted that while I have discussed my circuit in connection with a single phase source, a three phase source in which three sets of mechanical contacts are used could be similarly protected by providing each set of mechanical contacts with a circuit such as that of FIGURE 1 or FIGURE 2.

While I have described my invention with reference to the details of a specific embodiment thereof, many changes and variations will be apparent to those skilled in the art upon reading my description, and such can obviously be made without departing from the scope of my invention.

Having thus described my invention, what I claim is:

1. An arc suppressing circuit for a first switch, said first switch having first, second and third terminals and a contact movable to a first position in which said first and second terminals are conductively connected together and to a second position in which said first and third terminals are conductively connected together, said circuit comprising in combination a solid-state gate controlled A.C. switch having first and second power terminals and a gate terminal, said A.C. switch being transferred from a nonconducting to a conducting state between its power terminals by a current signal supplied to its gate terminal, and an impedance connected between said gate terminal and said first power terminal, said first power terminal being connected to said second terminal of said first switch, said gate terminal being connected to said third terminal of said first switch, and said second power terminal being connected to said first terminal of said first switch, whereby upon application of a voltage between the first and second terminals of said first switch with said contact in its second position said solid state switch is non-conducting, and movement of said contact from its second position toward its first position renders said solid state switch conducting until the power terminals of said A.C. switch are effectively shunted by the path between said first and said second terminals with said contact in its first position.

2. The apparatus of claim 1, in which said impedance is a resistor.

3. In combination with a two-position mechanical switch adapted to close an electrical circuit in a first position and to open the circuit in a second position, an arc suppression circuit comprising a gate-controlled A.C. switch having first and second power terminals and a gate terminal and triggerable from a blocked to a conducting state by a signal applied between said gate terminal and said first power terminal, means connecting said power terminals together when said switch is in its first position, a transformer, means connecting a winding of said transformer across said power terminals, means connecting a winding of said transformer between said gate terminal and said first power terminal of said A.C. switch and means connecting said gate terminal to said first power terminal when said mechanical switch is in its second position, whereby said A.C. switch is rendered conductive to applied alternating current when said two-position switch is moved from its second position until the power terminals are shunted by the two position switch in its first position.

References Cited

UNITED STATES PATENTS

| | | | |
|---|---|---|---|
| 2,789,253 | 4/1957 | Vang | 317—11 |
| 3,321,668 | 5/1967 | Baker | 317—11 |
| 3,330,992 | 7/1967 | Perrins | 317—11 |

OTHER REFERENCES

E. K. Howell: Application Note, "Triac Control for A.C. Power," 200.35, General Electric, p. 3, May 1964.

MILTON O. HIRSHFIELD, *Primary Examiner.*

J. D. TRAMMELL, *Assistant Examiner.*